United States Patent
Troy et al.

(10) Patent No.: US 12,420,199 B2
(45) Date of Patent: Sep. 23, 2025

(54) SYSTEM AND METHOD FOR MANAGING AVATARS FOR USE IN MULTIPLE 3D RENDERING PLATFORMS

(71) Applicant: Cross-Metaverse Avatars LLC, Sheridan, WY (US)

(72) Inventors: Kelvin Troy, Dublin (IE); John Michael O'Connor, Down (IE); Kenan Cain Chabuk, Olympia, WA (US); Kamuran Chabuk, Olympia, WA (US)

(73) Assignees: Kelvin John Troy, Dublin (IE); Brian Buchan, Dacula, GA (US); John Michael O'Connor, Down (IE)

(*) Notice: Subject to any disclaimer, the term of this patent is extended or adjusted under 35 U.S.C. 154(b) by 307 days.

(21) Appl. No.: 18/323,529

(22) Filed: May 25, 2023

(65) Prior Publication Data
US 2024/0390796 A1  Nov. 28, 2024

(51) Int. Cl.
| | |
|---|---|
| A63F 13/63 | (2014.01) |
| A63F 13/52 | (2014.01) |
| A63F 13/60 | (2014.01) |
| A63F 13/79 | (2014.01) |
| G06F 8/20 | (2018.01) |
| G06F 9/54 | (2006.01) |
| G06T 15/00 | (2011.01) |

(52) U.S. Cl.
CPC .............. *A63F 13/63* (2014.09); *A63F 13/52* (2014.09); *A63F 13/60* (2014.09); *A63F 13/79* (2014.09); *G06F 8/20* (2013.01); *G06F 9/547* (2013.01); *G06T 15/005* (2013.01); *A63F 2300/538* (2013.01); *A63F 2300/5553* (2013.01); *A63F 2300/66* (2013.01)

(58) Field of Classification Search
None
See application file for complete search history.

(56) References Cited

U.S. PATENT DOCUMENTS

| | | | |
|---|---|---|---|
| 2010/0229108 A1* | 9/2010 | Gerson | H04L 67/306 715/757 |
| 2017/0113140 A1* | 4/2017 | Blackstock | A63F 13/79 |
| 2020/0306637 A1* | 10/2020 | Baldwin | A63F 13/35 |
| 2021/0398095 A1* | 12/2021 | Mallett | G06Q 50/01 |
| 2024/0261679 A1* | 8/2024 | Kavallierou | A63F 13/424 |

* cited by examiner

*Primary Examiner* — Jason T Yen
(74) *Attorney, Agent, or Firm* — Young Basile Hanlon & MacFarlane, P.C.

(57) ABSTRACT

A system and a method for managing an avatar across multiple three-dimensional (3D) rendering platforms are disclosed. The system includes a content database, a content delivery module, a Software Development Kit (SDK) module, and an Application Programming Interface (API) module. The content database stores a 3D avatar model and associated first assets. The SDK module integrates with an in-engine avatar customization module of each 3D rendering platform and allows users to use these assets to customize their avatar during runtime. The API module receives requests for avatar and asset data. The content delivery module fetches requested avatar data and assets in response to requests received at the API module and delivers the requests to the SDK module. Additionally, the content delivery module fetches, stores, and manages second assets used for avatar customization from the SDK module.

18 Claims, 10 Drawing Sheets

SYSTEM AND METHOD FOR MANAGING AVATARS FOR USE IN MULTIPLE 3D RENDERING PLATFORMS

FIELD OF THE PRESENT DISCLOSURE

The present disclosure relates to a system and method for managing avatars and their associated assets across multiple 3D rendering platforms, such as video games, metaverses, and other 3D applications. More specifically, the present disclosure relates to a system that enables users to create, customize, and maintain a persistent digital avatar or identity with granular customization options that can be used across various platforms while ensuring seamless asset interchangeability, ownership, and optimized resource usage.

BACKGROUND

With the increasing popularity of virtual worlds, games, and metaverses, users often create and customize avatars to represent themselves in these environments. Many video games, metaverses, and other 3D applications exist that allow users to customize their avatars. These applications can be described as online social interactive platforms, where a user's avatar is how they are identified by other users. Often, these applications feature the ability to purchase cosmetic items to further personalize the avatar. Users meticulously configure their avatars in great detail, to represent themselves precisely the way they desire other users to see them. These avatars are, in a way, a user's identity in the digital world.

However, current avatar customization solutions are typically limited to a single game or platform, resulting in users having to create and manage multiple avatars across different environments. That is, when a user leaves one application and goes to another, the avatar designed in the previous application is confined to the application in which it was created. The user will need to make another avatar, often with very different configuration options, sometimes making it impossible to create a similar avatar. Additionally, any purchased cosmetics are not usable between applications, making them a poor investment. That is, users are unable to transfer their customized avatars or assets, such as clothing or accessories, between different games or platforms. In cases where an application closes down, the avatars and cosmetic purchases are lost forever. Such limitations can be frustrating for users, as they may invest time and resources into customizing their avatars in one environment, only to be unable to use them in another.

Some solutions exist which helps the users to create custom avatars that can be used in various virtual environments. However, these solutions require the users to manually export and import their avatars and associated assets between different environments, which can be cumbersome and time-consuming.

The present aims to address these problems by providing a solution that allows users to maintain a persistent avatar across multiple 3D applications and legitimately own all of their cosmetic purchases. This offers users the ability to have a persistent digital avatar or identity across the digital world.

SUMMARY

The present disclosure addresses the aforementioned problems by providing a system and method for managing an avatar for a user for use in multiple 3D rendering platforms. The present disclosure enables users to easily customize and modify their avatars using an SDK and API, allowing them to interchange assets for customization of the avatar at runtime across different games, metaverses, and other real-time 3D rendering environments.

In an aspect of the present disclosure, a system for managing an avatar for a user for use in multiple 3D rendering platforms to be executed in a user device is disclosed. Herein, each one of the multiple 3D rendering platforms comprises a 3D game engine module configured to render the avatar in runtime and an in-engine avatar customization module to allow the user to interchange assets for customization of the avatar at the runtime. The system comprises a content database configured to store a 3D model of the avatar and one or more first assets associated with the 3D model of the avatar, as available with the user. The system further comprises a content delivery module communicatively coupled with the content database. The system further comprises a Software Development Kit (SDK) module adaptively integrated with the in-engine avatar customization module of each one of the multiple 3D rendering platforms. The system further comprises an Application Programming Interface (API) module in communication with the content delivery module and the SDK module. Herein, the SDK module is configured to allow for utilization of the 3D model of the avatar and at least one of the one or more first assets compatible with the corresponding in-engine avatar customization module at the runtime, for the user to customize the avatar by implementing the corresponding in-engine avatar customization module. The API module is configured to receive a first request from the SDK module for the 3D model of the avatar and the at least one of the one or more first assets. The content delivery module is configured to fetch the 3D model of the avatar and the at least one of the one or more first assets from the content database in response to the first request at the API module, for delivery to the SDK module. The SDK module is further configured to fetch one or more second assets utilized by the user for customization of the avatar as available in and by implementation of the corresponding in-engine avatar customization module at the runtime. The API module is further configured to receive a second request from the SDK module for the one or more second assets for storage in the content database. The content delivery module is further configured to fetch the one or more second assets from the SDK module in response to the second request at the API module. The content database is configured to store the one or more second assets therein.

In one or more embodiments, the system further comprises a user account module configured to record ownership of the 3D model of the avatar, the one or more first assets and the one or more second assets for the user. In an embodiment, the user account module is configured to implement a distributed ledger for recording the ownership of the 3D model of the avatar, the one or more first assets and the one or more second assets for the user.

In one or more embodiments, the system further comprises a multi-application caching module configured to delete duplicate entries of the 3D model of the avatar, the one or more first assets and the one or more second assets between the multiple 3D rendering platforms in the user device.

In one or more embodiments, the content database and the content delivery module are executed in a server. In an embodiment, the server is a cloud-based server.

In one or more embodiments, the content database and the content delivery module are executed in the user device.

In one or more embodiments, the one or more first assets and the one or more second assets comprises at least one of: separate layer of clothing including shirt, t-shirt, pants, over-jacket; facial features; hair texture; hair color; eyeglasses; make-up features; mask; hat; jewelry; shoes; gloves; music.

In one or more embodiments, the user device comprises at least one of: a personal computer, a smartphone, a gaming console, a portable gaming device, a headset, a heads-up display.

In one or more embodiments, the multiple 3D rendering platforms comprises: video games, metaverses, social virtual reality applications.

In one or more embodiments, the 3D game engine module comprises at least one of: Unity engine®, Unreal engine®, Godot engine®, CryEngine®.

In another aspect of the present disclosure, a method for managing an avatar for a user for use in multiple 3D rendering platforms to be executed in a user device is disclosed. Herein, each one of the multiple 3D rendering platforms comprising a 3D game engine module configured to render the avatar in runtime and an in-engine avatar customization module to allow the user to interchange assets for customization of the avatar at the runtime. The method comprises storing, in a content database, a 3D model of the avatar and one or more first assets associated with the 3D model of the avatar, as available with the user. The method further comprises receiving a command from a user for utilization, via a SDK module integrated with the in-engine avatar customization module of each one of the multiple 3D rendering platforms, of the 3D model of the avatar and at least one of the one or more first assets compatible with the corresponding in-engine avatar customization module at the runtime, to customize the avatar. The method further comprises receiving a first request from the SDK module for the 3D model of the avatar and the at least one of the one or more first assets. The method further comprises fetching the 3D model of the avatar and the at least one of the one or more first assets from the content database in response to the first request, for delivery to the SDK module. The method also comprises fetching one or more second assets utilized by the user for customization of the avatar as available in and by implementation of the corresponding in-engine avatar customization module. The method further comprises receiving a second request from the SDK module for the one or more second assets for storage in the content database. The method further comprises fetching the one or more second assets from the SDK module in response to the second request. The method further comprises storing the one or more second assets in the content database.

In one or more embodiments, the method also comprises recording ownership of the 3D model of the avatar, the one or more first assets and the one or more second assets for the user. In an embodiment, the method comprises implementing a distributed ledger for recording the ownership of the 3D model of the avatar, the one or more first assets and the one or more second assets for the user.

In one or more embodiments, the method also comprises deleting duplicate entries of the 3D model of the avatar, the one or more first assets and the one or more second assets between the multiple 3D rendering platforms in the user device.

In one or more embodiments, the method also comprises executing the content database and the content delivery module in a server.

In one or more embodiments, the method also comprises executing the content database and the content delivery module in the user device.

In an aspect, a computer program is disclosed. The computer program comprises instructions which, when the computer program is executed by a processing unit, cause the processing unit to carry out steps of the aforementioned method.

It is to be appreciated that all the aforementioned implementation forms can be combined. It has to be noted that all devices, elements, circuitry, units, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity that performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which.

Figure 1:
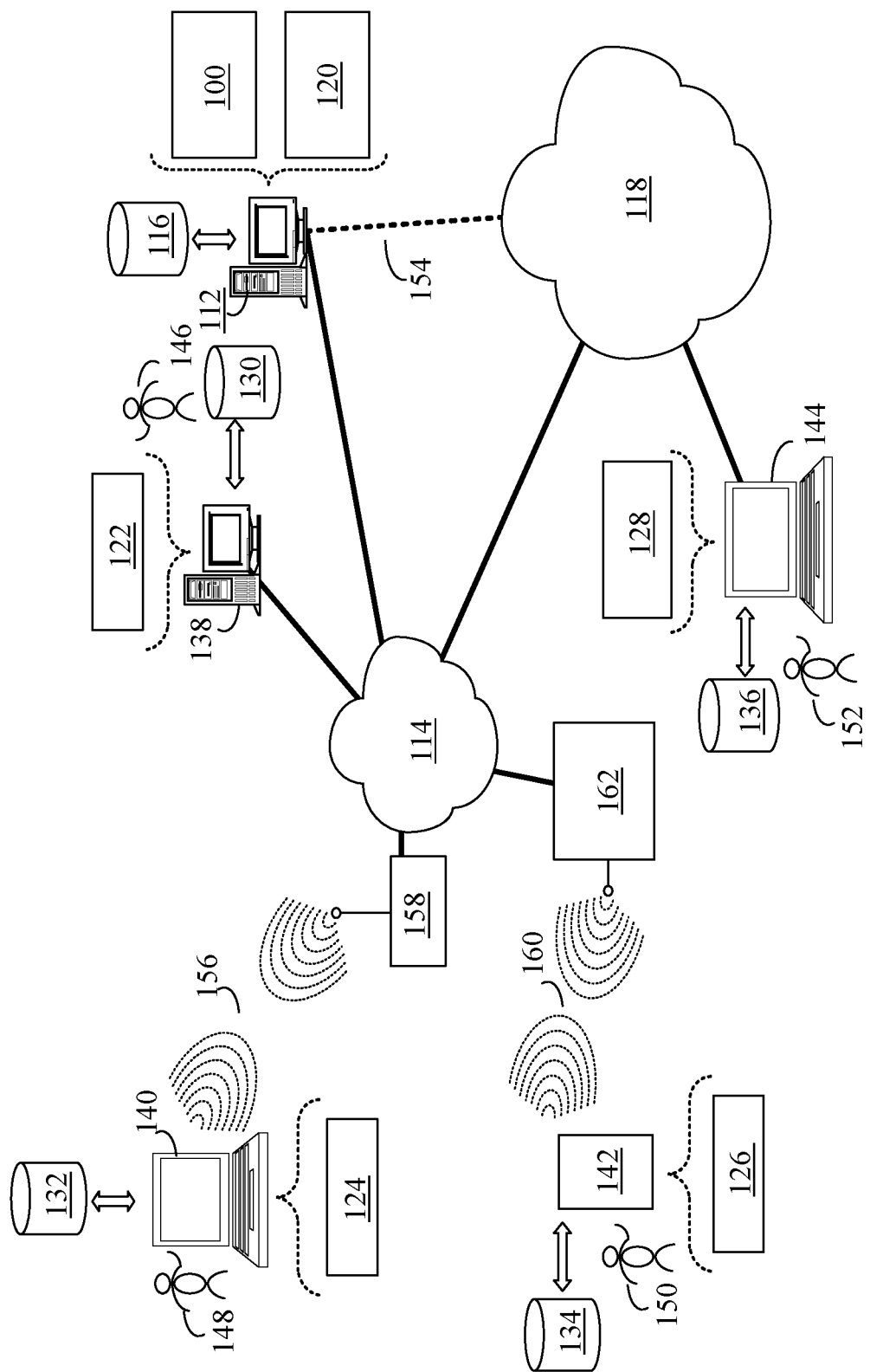
FIG. 1 illustrates a diagram of a computing arrangement for implementation of a system for managing an avatar for a user for use in multiple 3D rendering platforms, in accordance with one or more exemplary embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

In the following description, for purposes of explanation, numerous specific details are set forth in order to provide a thorough understanding of the present disclosure. It will be apparent, however, to one skilled in the art that the present disclosure is not limited to the specific details described herein.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Unless specified otherwise in the following description, the terms "perform", "calculate", "computer-assisted", "compute", "establish", "generate", "configure", "reconstruct", and the like preferably relate to operations and/or processes and/or processing steps that change and/or generate data and/or convert the data into other data, wherein the data may be represented or be present in particular in the form of physical variables, for example in the form of electrical impulses. The expression "computer" should in particular be interpreted as broadly as possible in order in particular to cover all electronic devices having data processing properties. Computers may thus for example be personal computers, servers, programmable logic controllers (PLCs), hand-held computer systems, pocket PC devices, mobile radio devices and other communication devices able to process data in a computer-assisted manner, processors and other electronic data processing devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Moreover, in particular a person skilled in the art, with knowledge of the method claim/method claims, is of course aware of all routine possibilities for realizing products or possibilities for implementation in the prior art, and so there is no need in particular for independent disclosure in the description. In particular, these customary realization variants known to the person skilled in the art can be realized exclusively by hardware components or exclusively by software components. Alternatively and/or additionally, the person skilled in the art, within the scope of his/her expert ability, can choose to the greatest possible extent arbitrary combinations according to embodiments of the invention for hardware components and software components in order to implement realization variants according to embodiments of the invention.

Some portions of the detailed description that follows are presented and discussed in terms of a process or method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fibre cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. In present implementations, the used language for training may be one of Python, Tensorflow, Bazel, C, C++. Further, decoder in user device (as will be discussed) may use C, C++ or any processor specific ISA. Furthermore, assembly code inside C/C++ may be utilized for specific operation. Also, ASR (automatic speech recognition) and G2P decoder along with entire user system can be run in embedded Linux® (any distribution), Android®, iOS®, Windows®, or the like, without any limitations. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to example implementation of FIG. 1, there is shown a computing arrangement 100 that may reside on and may be executed by a computer (e.g., computer 112), which may be connected to a network (e.g., network 114) (e.g., the internet or a local area network). Examples of computer 112 may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 112 may execute an operating system, for example, but not limited to, Microsoft Windows®; Mac OS X®; Red Hat Linux®, or a custom operating system.

In some implementations, the instruction sets and subroutines of computing arrangement 100, which may be stored on storage device, such as storage device 116, coupled to computer 112, may be executed by one or more processors (not shown) and one or more memory architectures included within computer 112. In some implementations, storage device 116 may include but is not limited to: a hard disk drive; a flash drive, a tape drive; an optical drive; a RAID array (or other array); a random-access memory (RAM); and a read-only memory (ROM).

In some implementations, network 114 may be connected to one or more secondary networks (e.g., network 118), examples of which may include but are not limited to: a local area network; a wide area network; or an intranet, for example.

In some implementations, computer 112 may include a data store, such as a database (e.g., relational database, object-oriented database, triplestore database, etc.) and may be located within any suitable memory location, such as storage device 116 coupled to computer 112. In some implementations, data, metadata, information, etc. described throughout the present disclosure may be stored in the data store. In some implementations, computer 112 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, computing arrangement 100 may be a component of the data store, a standalone application that interfaces with the above noted data store and/or an applet/application that is accessed via client applications 122, 124, 126, 128. In some implementations, the above noted data store may be, in whole or in part, distributed in a cloud computing topology. In this way, computer 112 and storage device 116 may refer to multiple devices, which may also be distributed throughout the network.

In some implementations, computer 112 may execute application 120 for managing an avatar for a user for use in multiple 3D rendering platforms. In some implementations, computing arrangement 100 and/or application 120 may be accessed via one or more of client applications 122, 124, 126, 128. In some implementations, computing arrangement 100 may be a standalone application, or may be an applet/application/script/extension that may interact with and/or be executed within application 120, a component of application 120, and/or one or more of client applications 122, 124, 126, 128. In some implementations, application 120 may be a standalone application, or may be an applet/application/script/extension that may interact with and/or be executed within computing arrangement 100, a component of computing arrangement 100, and/or one or more of client applications 122, 124, 126, 128. In some implementations, one or more of client applications 122, 124, 126, 128 may be a standalone application, or may be an applet/application/script/extension that may interact with and/or be executed within and/or be a component of computing arrangement 100 and/or application 120. Examples of client applications 122, 124, 126, 128 may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications 122, 124, 126, 128, which may be stored on storage devices 130, 132, 134, 136, coupled to user devices 138, 140, 142, 144, may be executed by one or more processors and one or more memory architectures incorporated into user devices 138, 140, 142, 144.

In some implementations, one or more of storage devices 130, 132, 134, 136, may include but are not limited to: hard disk drives; flash drives, tape drives; optical drives; RAID arrays; random access memories (RAM); and read-only memories (ROM). Examples of user devices 138, 140, 142, 144 (and/or computer 112) may include, but are not limited to, a personal computer (e.g., user device 138), a laptop computer (e.g., user device 140), a smart/data-enabled, cellular phone (e.g., user device 142), a notebook computer (e.g., user device 144), a tablet (not shown), a server (not shown), a television (not shown), a smart television (not shown), a media (e.g., video, photo, etc.) capturing device (not shown), and a dedicated network device (not shown). User devices 138, 140, 142, 144 may each execute an operating system, examples of which may include but are not limited to, Android, Apple IOS, Mac OS X; Red Hat Linux, or a custom operating system.

In some implementations, one or more of client applications 122, 124, 126, 128 may be configured to effectuate some or all of the functionality of computing arrangement 100 (and vice versa). Accordingly, in some implementations, computing arrangement 100 may be a purely server-side application, a purely client-side application, or a hybrid server-side/client-side application that is cooperatively executed by one or more of client applications 122, 124, 126, 128 and/or computing arrangement 100.

In some implementations, one or more of client applications 122, 124, 126, 128 may be configured to effectuate some or all of the functionality of application 120 (and vice versa). Accordingly, in some implementations, application 120 may be a purely server-side application, a purely client-side application, or a hybrid server-side/client-side application that is cooperatively executed by one or more of client applications 122, 124, 126, 128 and/or application 120. As one or more of client applications 122, 124, 126, 128, computing arrangement 100, and application 120, taken singly or in any combination, may effectuate some or all of the same functionality, any description of effectuating such functionality via one or more of client applications 122, 124,

126, 128, computing arrangement 100, application 120, or combination thereof, and any described interaction(s) between one or more of client applications 122, 124, 126, 128, computing arrangement 100, application 120, or combination thereof to effectuate such functionality, should be taken as an example only and not to limit the scope of the disclosure.

In some implementations, one or more of users 146, 148, 150, 152 may access computer 112 and computing arrangement 100 (e.g., using one or more of user devices 138, 140, 142, 144) directly through network 114 or through secondary network 118. Further, computer 112 may be connected to network 114 through secondary network 118, as illustrated with phantom link line 154. Computing arrangement 100 may include one or more user interfaces, such as browsers and textual or graphical user interfaces, through which users 146, 148, 150, 152 may access computing arrangement 100.

In some implementations, the various user devices may be directly or indirectly coupled to communication network, such as communication network 114 and communication network 118, hereinafter simply referred to as network 114 and network 118, respectively. For example, user device 138 is shown directly coupled to network 114 via a hardwired network connection. Further, user device 144 is shown directly coupled to network 118 via a hardwired network connection. User device 140 is shown wirelessly coupled to network 114 via wireless communication channel 156 established between user device 140 and wireless access point (i.e., WAP) 158, which is shown directly coupled to network 114. WAP 158 may be, for example, an IEEE 802.11a, 802.11b, 802.11g. Wi-Fi, RFID, and/or Bluetooth (including Bluetooth Low Energy) device that is capable of establishing wireless communication channel 156 between user device 140 and WAP 158. User device 142 is shown wirelessly coupled to network 114 via wireless communication channel 160 established between user device 142 and cellular network/bridge 162, which is shown directly coupled to network 114.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example, Bluetooth (including Bluetooth Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
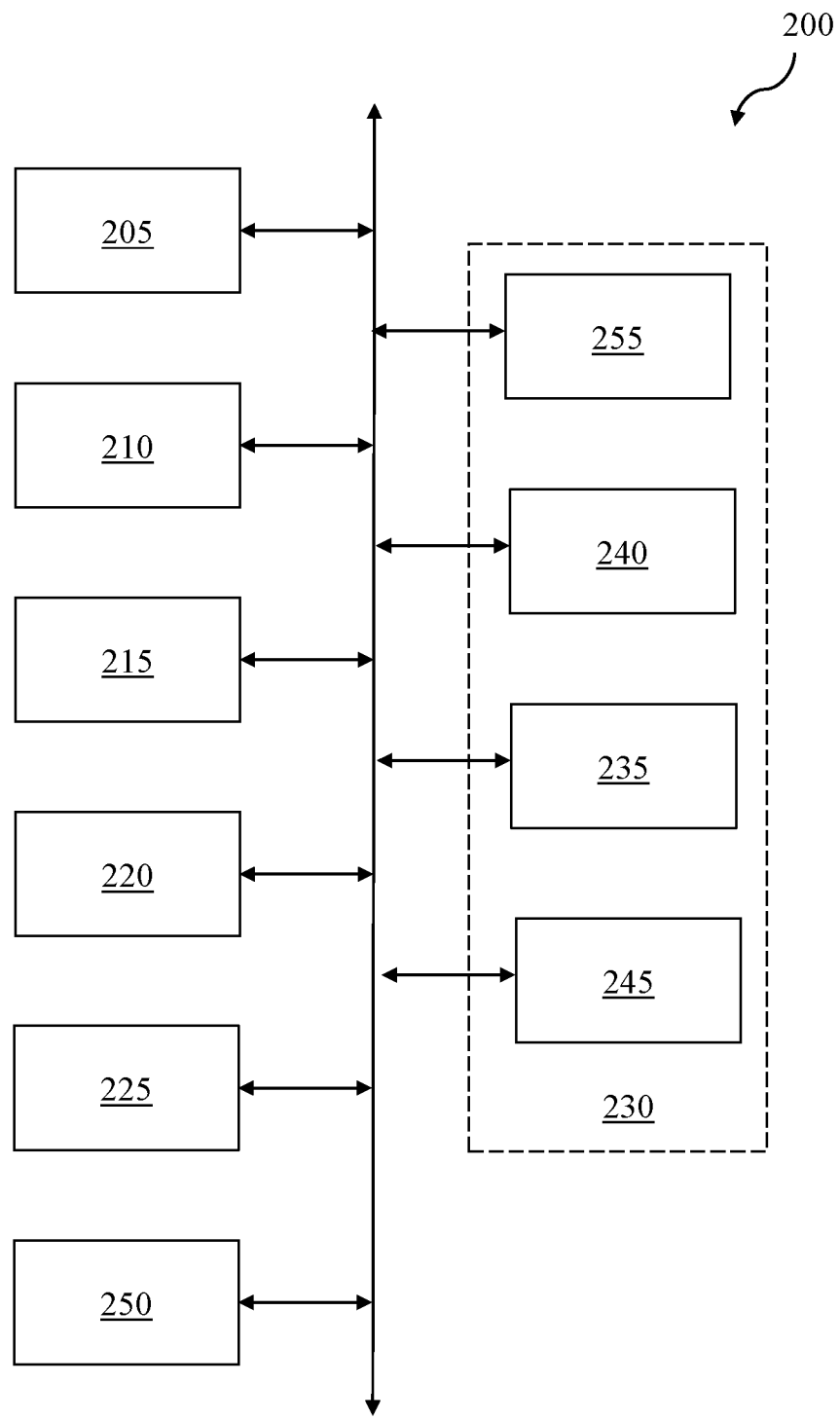
FIG. 2 illustrates a diagram of a server, in accordance with one or more exemplary embodiments of the present disclosure.

The computing arrangement 100 may include a server (such as server 200, as shown in FIG. 2) for managing an avatar for a user for use in multiple 3D rendering platforms. In the present implementations, the computing arrangement 100 itself may be embodied as the server 200. Herein, FIG. 2 is a block diagram of an example of the server 200 capable of implementing embodiments according to the present disclosure. In the example of FIG. 2, the server 200 may include a processing unit 205 for running software applications (such as, the application 120 of FIG. 1) and optionally an operating system. As illustrated, the server 200 may further include a database 210 which stores applications and data for use by the processing unit 205. Storage 215 provides non-volatile storage for applications and data and may include fixed disk drives, removable disk drives, flash memory devices, and CD-ROM, DVD-ROM or other optical storage devices. An optional user input device 220 may include devices that communicate user inputs from one or more users to the server 200 and may include keyboards, mice, joysticks, touch screens, etc. A communication or network interface 225 is provided which allows the server 200 to communicate with other computer systems via an electronic communications network, including wired and/or wireless communication and including an Intranet or the Internet. In one embodiment, the server 200 receives instructions and user inputs from a remote computer through communication interface 225. Communication interface 225 can comprise a transmitter and receiver for communicating with remote devices. An optional display device 250 may be provided which can be any device capable of displaying visual information in response to a signal from the server 200. The components of the server 200, including the processing unit 205, the database 210, the data storage 215, the user input devices 220, the communication interface 225, and the display device 250, may be coupled via one or more data buses 260.

In the embodiment of FIG. 2, a graphics system 230 may be coupled with the data bus 260 and the components of the server 200. The graphics system 230 may include a physical graphics processing arrangement (GPU) 235 and graphics memory. The GPU 235 generates pixel data for output images from rendering commands. The physical GPU 235 can be configured as multiple virtual GPUs that may be used in parallel (concurrently) by a number of applications or processes executing in parallel. For example, mass scaling processes for rigid bodies or a variety of constraint solving processes may be run in parallel on the multiple virtual GPUs. Graphics memory may include a display memory 240 (e.g., a framebuffer) used for storing pixel data for each pixel of an output image. In another embodiment, the display memory 240 and/or additional memory 245 may be part of the database 210 and may be shared with the processing unit 205. Alternatively, the display memory 240 and/or additional memory 245 can be one or more separate memories provided for the exclusive use of the graphics system 230. In another embodiment, the graphics processing arrangement 230 may include one or more additional physical GPUs 255, similar to the GPU 235. Each additional GPU 255 may be adapted to operate in parallel with the GPU 235. Each additional GPU 255 generates pixel data for output images from rendering commands. Each additional physical GPU 255 can be configured as multiple virtual GPUs that may be used in parallel (concurrently) by a number of applications or processes executing in parallel, e.g., processes that solve constraints. Each additional GPU 255 can operate in conjunction with the GPU 235, for example, to simultaneously generate pixel data for different portions of an output image, or to simultaneously generate pixel data for different output images. Each additional GPU 255 can be located on the same circuit board as the GPU 235, sharing a connection with the GPU 235 to the data bus 260, or each additional GPU 255 can be located on another circuit board separately coupled with the data bus 260. Each additional GPU 255 can also be integrated into the same module or chip package as the GPU 235. Each additional GPU 255 can have additional memory, similar to the display memory 240 and additional memory 245, or can share the memories 240 and 245 with the GPU 235. It is to be understood that the circuits and/or functionality of GPU as described herein could also be implemented in other types of processors, such as general-purpose or other special-purpose coprocessors, or within a CPU.

Figure 3:
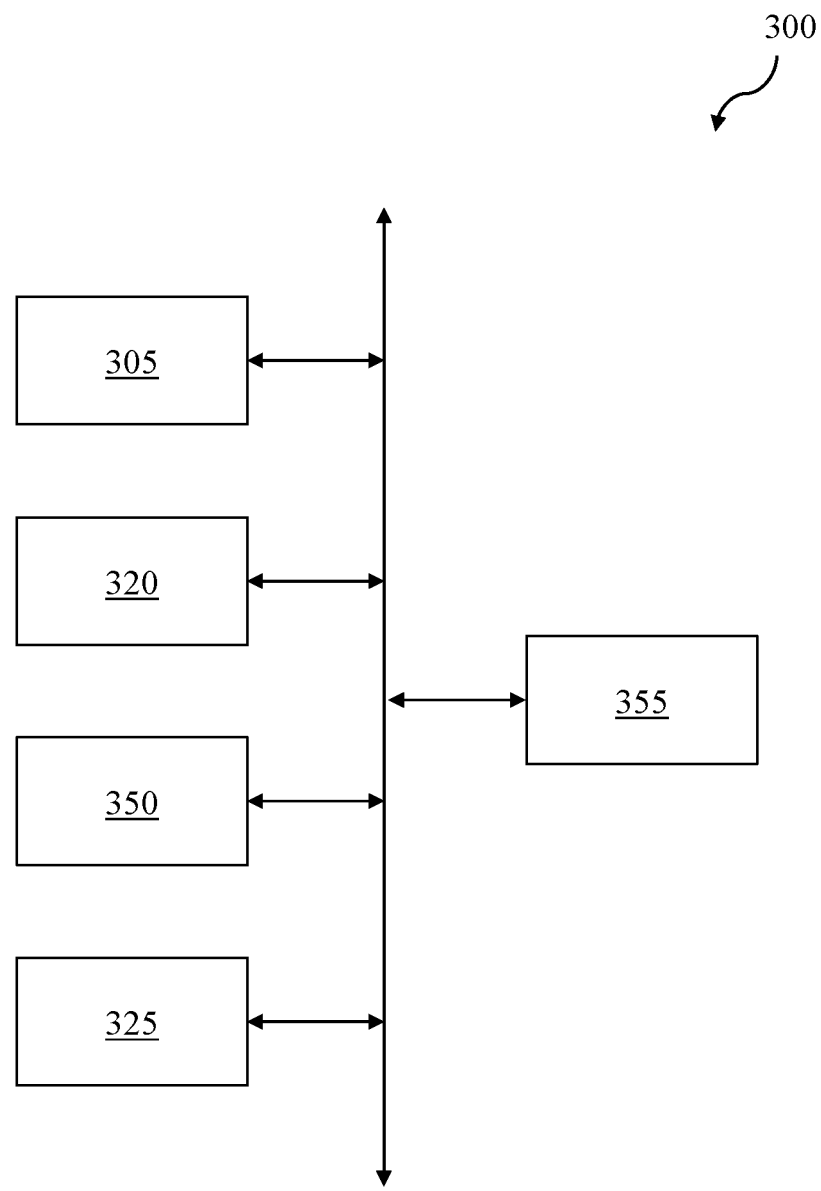
FIG. 3 illustrates a diagram of a user device, in accordance with one or more exemplary embodiments of the present disclosure.

The computing arrangement 100 may also include a user device 300 (as shown in FIG. 3). In embodiments of the present disclosure, the user device 300 may embody a smartphone, a personal computer, a tablet, or the like. Herein, FIG. 3 is a block diagram of an example of the user device 300 capable of implementing embodiments according to the present disclosure. In the example of FIG. 3, the user device 300 may include a processor 305 (hereinafter, referred to as CPU 305) for running software applications (such as, the application 120 of FIG. 1) and optionally an operating system. A user input device 320 is provided which may include devices that communicates user inputs from one or more users and may include keyboards, mice, joysticks, touch screens, and/or microphones. Further, a network adapter 325 is provided which allows the user device 300 to communicate with other computer systems (e.g., the server 200 of FIG. 2) via an electronic communications network, including wired and/or wireless communication and including the Internet. The user device 300 may also include a decoder 355 may be any device capable of decoding (decompressing) data that may be encoded (compressed). A display device 350 may be provided which may be any device capable of displaying visual information, including information received from the decoder 355. In particular, as will be described below, the display device 350 may provide an interface, such that the display device 350 is configured to display information received from the server 200 of FIG. 2. The components of the user device 300 may be coupled via one or more data buses 360.

Figure 4:
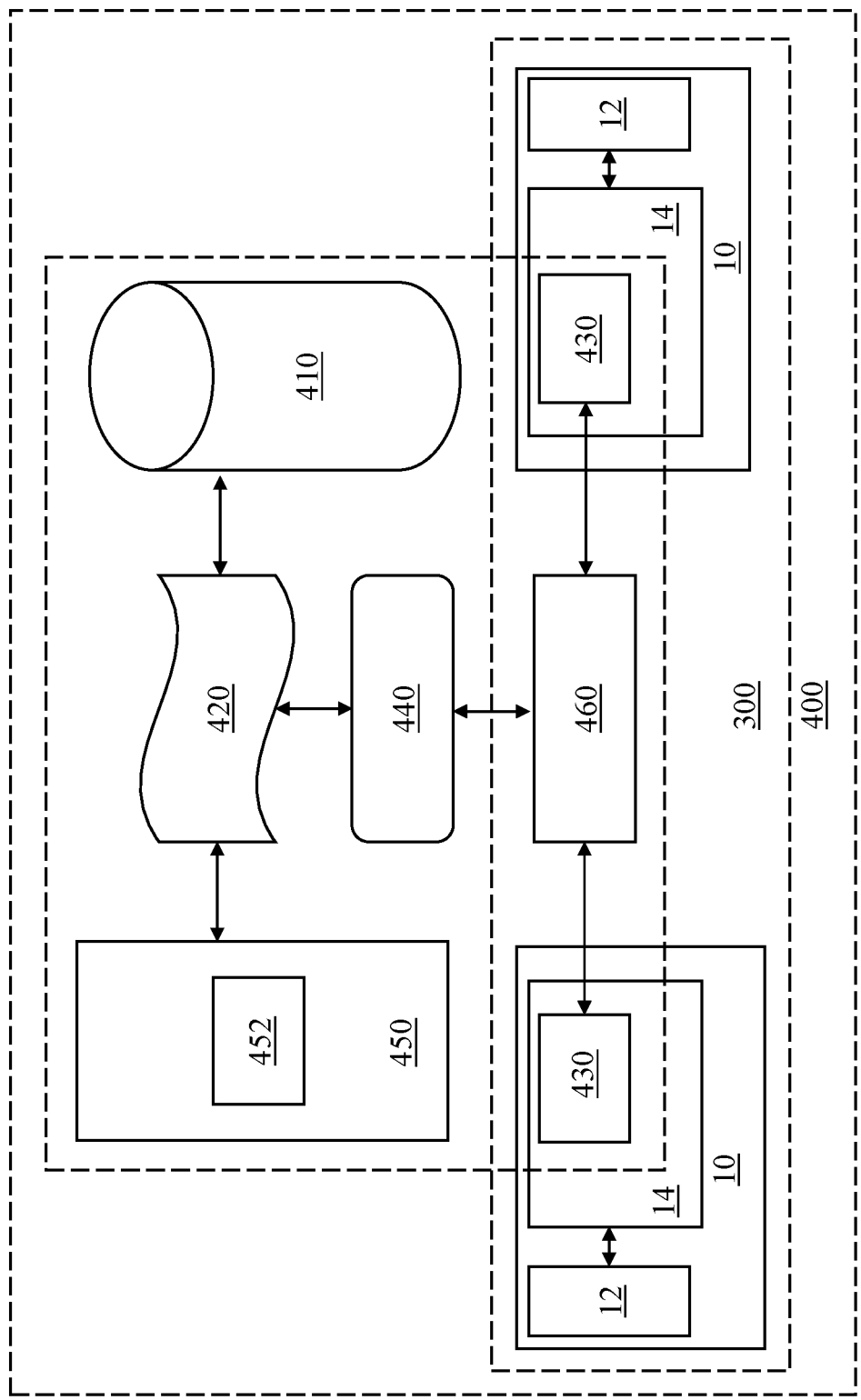
FIG. 4 illustrates a diagram of a system for managing an avatar for a user for use in multiple 3D rendering platforms, in accordance with one or more exemplary embodiments of the present disclosure.

Referring to FIG. 4, illustrated is an exemplary block diagram of a system 400 for managing an avatar for a user for use in multiple 3D rendering platforms (as represented by reference numeral 10). The system 400, as described in the present disclosure, is integrated within the computing arrangement 100, and may be specifically implemented in the user device 300 in combination with (or without) the server 200 of the computing arrangement 100. Herein, the server 200 may manage and coordinate the necessary data, processing, and communication required for the proper functioning of the system 400. Simultaneously, the user device 300 may serve as an interactive interface for users to engage with the system 400, offering customization options, access to assets, and seamless interaction with the multiple real-time 3D rendering platforms. By implementing the system 400 within the server 200 and the user device 300, the present invention ensures a comprehensive and coherent framework for creating and customizing avatars, as well as providing a consistent user experience across various games, metaverses, or any other real-time 3D rendered environments.

In context of the present disclosure, the 3D rendering platforms 10 refer to various interactive digital environments that utilize real-time 3D graphics to display and navigate within their respective virtual worlds. The 3D rendering platforms 10 cater to different audiences and purposes, creating diverse experiences that rely on 3D graphics technology for realistic and engaging interactions. In present examples, the 3D rendering platforms 10 may be real-time rendering platforms, in which the real-time aspect signifies that the graphical content is continuously rendered and updated based on user interactions, ensuring a responsive and dynamic experience. Real-time 3D graphics technology enables the rendering of 3D scenes, objects, and characters with rapid updates based on user inputs or changing conditions within the virtual environment. Such technology relies on sophisticated algorithms and hardware acceleration to achieve smooth and fluid visuals, allowing users to experience an immersive, dynamic, and interactive environment.

Specifically, in embodiments of the present disclosure, the 3D rendering platforms 10 include those platforms that provide an avatar for the user, allowing the users to represent themselves within the virtual environment. As used herein, an avatar is a customizable digital representation of the user within the virtual environment. The avatar may take various forms, ranging from human-like characters to fantastical creatures or abstract entities, depending on the specific platform and user preferences. The avatar serves as the user's digital identity, allowing them to interact with other users and the virtual environment. The objective of the present disclosure is to enable users to maintain a consistent and persistent avatar across these diverse platforms, enhancing their experience and digital identity. The system 400 of the present disclosure aims to manage the avatars for the user, so that these avatars may be used across various 3D rendering platforms 10, allowing users to maintain a consistent and persistent digital identity throughout their online experiences.

For purposes of the present disclosure, the multiple 3D rendering platforms 10 encompass a wide range of interactive digital environments, including video games, metaverses, and social virtual reality applications. Video games are interactive entertainment experiences that involve real-time 3D graphics to create immersive environments for players to navigate and engage with. They can span various genres, such as role-playing games (RPGs), first-person shooters (FPS), and massively multiplayer online games (MMOs). Metaverses are expansive, interconnected virtual worlds that allow users to explore, socialize, and participate in various activities. These digital spaces provide a platform for users to create and customize their own avatars, build virtual environments, and interact with other users in real-time. Metaverses can be used for a wide range of purposes, including entertainment, education, social networking, e-commerce, and collaborative workspaces. Social virtual reality applications are platforms that utilize virtual reality (VR) technology to create immersive social experiences for users. These applications enable users to interact with others in a shared virtual environment, using avatars as their digital representations. In each of these 3D rendering platforms, avatars play a critical role in representing users and enabling them to interact within the virtual environment.

As may be contemplated, each one of the multiple 3D rendering platforms 10 may include a 3D game engine module (as represented by reference numeral 12) configured to render the avatar in runtime. The 3D game engine module 12 is a software framework designed for the development and execution of interactive 3D applications, such as video games, simulations, and virtual environments. The 3D game engine module 12 provides a range of tools and functionalities, including rendering, physics, animation, and artificial intelligence, that enable developers to create immersive and interactive experiences. Rendering is the process of converting the digital representation of an avatar, including its geometry, textures, and animations, into a visually coherent form that can be displayed on the user's device. As used herein, runtime refers to the period during which a 3D application or game is actively executing and being interacted with by the user. In contrast to the development phase, where assets and functionalities are being created and integrated, runtime encompasses the actual experience of the user as they navigate and interact within the 3D environment.

Herein, the 3D game engine module 12 may include at least one of the following popular and widely-used game engines, such as Unity engine®, Unreal engine®, Godot engine®, CryEngine®. Each of these game engines offers unique capabilities and advantages, and the present disclosure may be implemented using any one or a combination of these engines to create a seamless and persistent avatar experience across the multiple 3D rendering platforms 10. By leveraging the capabilities of the 3D game engine module 12, the avatar can be rendered in real-time, allowing for smooth and responsive interaction with the virtual environment and other users. In addition to rendering the avatar, the 3D game engine module 12 may also manage other aspects of the avatar's behavior and appearance during runtime, such as handling animation, collision detection, and physics interactions. This ensures that the user's avatar behaves and reacts realistically within the context of the 3D rendering platform 10, providing a seamless and immersive experience.

Further, each one of the multiple 3D rendering platforms 10 may include an in-engine avatar customization module (as represented by reference numeral 14) to allow the user to interchange assets for customization of the avatar at the runtime. That is, the in-engine avatar customization module 14 enables the users to seamlessly interchange and modify assets of their avatar in real-time while they are using the 3D rendering platforms 10. The in-engine avatar customization module 14 allows for a more dynamic and personalized experience by providing users with the ability to make adjustments to their avatars without having to leave the platform or restart the application. By offering these customization options and more within the 3D rendering platforms 10, the in-engine avatar customization module 14 significantly enhances the user experience, promoting a deeper sense of identity and personalization within the digital world.

As used herein, the assets refer to a wide range of customizable elements or components that users can apply to their avatars in order to personalize and enhance their digital personas. These assets helps in creating a unique and distinctive appearance for each user's avatar, contributing to a more immersive and engaging experience across the 3D rendering platforms 10. The assets may encompass a diverse array of customizable elements, including separate layer of clothing including shirt, t-shirt, pants, over-jacket; facial features; hair texture; hair color; eye-glasses; make-up features; mask; hat; jewelry; shoes; gloves; music. The separate layers of clothing such as shirts, t-shirts, pants, and over-jackets allow users to mix and match different styles and outfits, and can be layered on top of each other. Additionally, users can modify facial features to create a desired expression or resemblance, while hair texture and color options provide further customization possibilities. Accessories such as eye-glasses, make-up features, masks, hats, and jewelry can be added or removed to give the avatar a unique look. Further, users can choose from a variety of shoes and gloves to complete their avatars' outfits. Furthermore, music can serve as an audio asset that adds a personal touch to the user's digital persona. Users can select a specific track, melody, or sound effect to accompany their avatar, creating a unique auditory signature that reflects their taste and style. By providing a comprehensive selection of assets, the present invention enables users to tailor their digital identities to their personal preferences, fostering a greater sense of individuality and self-expression within the virtual worlds of 3D rendering platforms.

As discussed, the in-engine avatar customization module 14 offers users the ability to effortlessly interchange and modify their avatars' assets in real-time as they engage with the 3D rendering platforms 10. Swapping outfits is one example, as users within a metaverse or virtual social space may wish to alter their avatars' clothing to suit a specific theme or event. The in-engine avatar customization module 14 facilitates easy transitions between various outfits or clothing pieces, rendering avatars readily adaptable to diverse situations. Additionally, the in-engine avatar customization module 14 permits users to adjust facial features to convey a particular emotion or more accurately reflect their real-life appearance, thereby enhancing the authenticity and personal connection with their digital personas. Accessory customization is another feature of the in-engine avatar customization module 14, enabling users to add or remove items such as hats, glasses, or jewelry for an added layer of personalization. Users can conveniently experiment with a range of accessory combinations to achieve their desired look or style. Changing hairstyles is also made possible through the in-engine avatar customization module 14, allowing users to modify their avatars' hairstyles to suit their preferences or to align with a specific event or theme, all without leaving the 3D rendering platform 10. Lastly, the in-engine avatar customization module 14 may incorporate in-game items, wearables, or assets acquired within a specific game or platform into the user's avatar. This functionality enables users to display their in-game achievements or purchases across multiple 3D rendering platforms 10.

In present examples, the 3D rendering platforms 10 may be executed in a user device (such as, the user device 300). That is, these 3D rendering platforms 10 can be accessed by users through their user devices 300, which encompass a wide range of hardware and form factors to provide versatile and convenient access to the virtual worlds. For purposes of the present disclosure, the user device 300 may include various types of hardware that allow users to access and interact with the 3D rendering platforms 10. In present embodiments, the user device 300 may include at least one of: a personal computer, a smartphone, a gaming console, a portable gaming device, a headset, a heads-up display. Herein, a personal computer, for example, can be a desktop or laptop computer that enables users to run gaming applications, virtual worlds, or metaverse platforms, providing a wide range of customization and interaction options through peripherals such as a keyboard, mouse, or gaming controllers. A smartphone, on the other hand, offers a portable and convenient way for users to access these platforms through mobile applications, utilizing touch-based controls and built-in sensors for interaction. Gaming consoles, such as PlayStation®, Xbox®, or Nintendo Switch®, provide a dedicated platform for gaming experiences, including online multiplayer games and social virtual worlds, often with specialized controllers for intuitive input. Portable gaming devices, like the Nintendo Switch Lite or PlayStation Vita, combine the convenience of a mobile device with dedicated gaming hardware, allowing users to engage with their avatars on-the-go. Headsets, such as VR or augmented reality (AR) devices, immerse users in the virtual environment, providing an even more immersive and intuitive experience through natural movements and gestures. Finally, heads-up displays, like Google Glass or other smart glasses, overlay digital information onto the user's view of the real world, enabling seamless integration between the virtual and physical realms. Each of these user devices 300 allows users to interact with their avatars across the said multiple 3D rendering platforms 10.

According to an embodiment, as illustrated in FIG. 4, the system 400 of the present disclosure includes a content database 410 configured to store a 3D model of the avatar and one or more assets associated with the 3D model of the avatar, as available with the user; a content delivery module 420 communicatively coupled with the content database 410, and configured to fetch the avatar and the assets from the content database 410 and deliver the required data as required; a SDK module 430 adapted to be integrated with the in-engine avatar customization module 14 of each one of the multiple 3D rendering platforms 10, and configured to allow for utilization of the said 3D model of the avatar and at least one of the said one or more assets compatible with the corresponding in-engine avatar customization module at the runtime, for the user to customize the avatar by implementing the said corresponding in-engine avatar customization module; and an API module 440 in communication with the content delivery module 420 and the SDK module 430, and configured to process requests from the SDK module 430 for avatar and asset data from the content database 410 via the content delivery module 420.

In particular, the content database 410 is designed to store and manage the 3D models of avatars along with one or more assets associated with each respective 3D model of the avatar. The content database 410 ensures that the user's avatar and associated assets are readily available for use across various real-time 3D rendering platforms 10. By housing the 3D models of user avatars and their associated assets in a centralized location, the content database 410 enables efficient data management and retrieval, facilitating seamless access and interaction with the avatars across multiple 3D rendering platforms 10. The content database 410 may also ensure that user avatars and associated assets are compatible with different real-time 3D rendering platforms 10. Metadata associated with each avatar and asset may also be stored in the content database 410. This metadata may include, but is not limited to, asset type, asset category, asset creator information, and asset ownership information.

In some examples, the content database 410 may also support versioning for avatars and assets, enabling users to maintain multiple versions of their avatar or individual assets. This feature allows users to revert to a previous version of their avatar or asset if desired, providing an additional level of customization and control. In some examples, the content database 410 may be configured with appropriate access control mechanisms, ensuring that users can only access and modify their own avatars and associated assets. These access controls may include authentication, authorization, and encryption techniques to protect user data and maintain privacy. The content database 410 may also be structured in a hierarchical manner, with each user's avatar and its associated assets grouped together. The content database 410 may utilize a scalable and efficient storage system that can accommodate the growing number of avatars and associated assets. Such storage system may employ a combination of relational databases, NoSQL databases, and/or distributed file systems to ensure the optimal organization and retrieval of data. To further enhance the performance of the content database, various optimization techniques may be employed, such as caching, indexing, and load balancing. These techniques help ensure that the content database can efficiently serve avatars and assets to users across multiple real-time 3D rendering platforms, even under high-traffic conditions.

The SDK module 430 enables the integration and seamless interoperability of the in-engine avatar customization module 14 across the multiple 3D rendering platforms 10. The SDK module 430 provides developers with the necessary tools, libraries, and guidelines to implement the system's functionalities within the respective 3D rendering platforms 10. Specifically, the SDK module 430 facilitates the utilization of the 3D model of the avatar and at least one of the assets stored in the content database 410, ensuring compatibility with the corresponding in-engine avatar customization module 14. By integrating the SDK module 430 into the 3D rendering platforms 10, developers can enable users to customize their avatars using the available assets (and any additional second assets, as discussed later in the description) in real-time, during runtime of the corresponding 3D rendering platform 10. Thus, the SDK module 430 serves as a link in the system 400, bridging the gap between the content database 410, and the in-engine avatar customization module 14 and the multiple 3D rendering platforms 10.

It may be understood that the SDK module 430 takes into consideration the unique requirements and specifications of the corresponding in-engine avatar customization module 14 when allowing for the utilization of the 3D model of the avatar and at least one of the assets. This involves converting or adapting the 3D model and assets into a format that can be readily understood and processed by the in-engine avatar customization module. The SDK module 430 may also account for any differences in the way assets are handled, rendered, or animated across different 3D rendering platforms 10, ensuring that the avatar and associated assets maintain their intended appearance and functionality regardless of the 3D rendering platform 10. It may also be appreciated that in addition to providing compatibility between with the multiple 3D rendering platforms 10, the SDK module 430 may also help maintain a consistent user experience. The SDK module 430 ensures that the avatar customization features are accessible and function similarly across different 3D rendering platforms 10, thereby allowing the users to modify their avatars quickly and easily without encountering platform-specific limitations or discrepancies. Furthermore, the SDK module enables the developers to add or update avatar assets, customization options, and other features as needed, ensuring that the system 400 remains adaptable and up-to-date with evolving user preferences and industry trends.

The API module 440 facilitates seamless communication between various components, such as the content delivery module 420, the SDK module 430, and other integrated services in the system 400. By providing a standardized set of protocols, conventions, and functions, the API module 440 ensures that different parts of the system 400 can efficiently exchange information and work together harmoniously. Specifically, herein, the API module 440 is configured to receive a request from the SDK module 430 for specific resources, such as the 3D model of the avatar and the associated assets. Upon receiving the request, the API module 440 processes the request and communicates with the content delivery module 420 to retrieve the requested data. After acquiring the necessary information, the API module 440 sends the data back to the SDK module 430, which in turn utilizes the data to customize and render the avatar within the corresponding 3D rendering platform 10. It may be appreciated that, additionally, the API module 440 may also serve as an abstraction layer in the system 400, shielding the internal workings of the system 400 and providing a simplified interface for developers to work with. This allows developers to focus on building and customizing their avatars and assets without needing to delve into the intricacies of underlying architecture the system 400.

The content delivery module 420 is responsible for the efficient retrieval and delivery of the 3D model of the avatar and the associated assets from the content database 410 to the SDK module 430. The content delivery module 420 facilitates seamless communication between the content database 410 and the SDK module 430, ensuring that the necessary avatar and asset data are readily available for customization and rendering within the various 3D rendering platforms. Specifically, the content delivery module 420 processes the incoming request from the API module 440, queries the content database 410, and retrieves the relevant data. The integration of the content delivery module 420 within the present system 400 helps to maintain a seamless and efficient workflow between the content database 410, the API module 440, and the SDK module 430. By working in tandem with these other components, the content delivery module 420 allows users to access and customize their avatars and assets with minimal delays, regardless of their specific 3D rendering platform 10 or the user device 300.

In addition to its primary function of fetching and delivering the 3D model of the avatar and the assets, the content delivery module 420 may also serve a broader role in optimizing the performance and user experience within the system 400. The content delivery module 420 may employ various caching mechanisms and strategies to minimize latency, reduce bandwidth consumption, and ensure the timely delivery of content. For instance, to improve performance and reduce response times, the content delivery module 420 may incorporate a caching mechanism which stores frequently requested avatar models and assets in a cache, thereby minimizing the need for repetitive database queries and speeding up content delivery. To handle varying levels of demand and ensure optimal performance, the content delivery module 420 may include a load balancing component, which distributes incoming requests across multiple instances of the content delivery module 420, ensuring that no single instance becomes overwhelmed with traffic. To protect the integrity of the content and prevent unauthorized access, the content delivery module 420 may also incorporate security and authentication mechanisms, which validate incoming requests, verify user credentials, and apply encryption to the content as necessary.

The content delivery module 420 may also leverage advanced algorithms and techniques to prioritize and manage the delivery of assets based on factors such as network conditions, user location, and device capabilities. This ensures that the user experience remains consistent and responsive, even in situations where network connectivity or device performance may be less than optimal. In an embodiment, the content delivery module 420 utilizes a Content Delivery Network (CDN) to further optimize the retrieval and distribution of the 3D model of the avatar and the associated assets to user devices 300 across various 3D rendering platforms 10. A CDN is a globally distributed network of servers that work together to provide fast and efficient delivery of content to users based on their geographical location and proximity to the CDN servers. By leveraging the geographical distribution of CDN servers, the content delivery module 420 can deliver the 3D model of the avatar and the assets from a server that is closer to the user's location, resulting in reduced latency and faster response times. The CDN may further improve reliability by distributing content across multiple servers and locations, ensuring that the 3D model of the avatar and the assets remain available and accessible even in the event of server outages or network disruptions. Further, as the number of users and the demand for content increases, the CDN can easily scale to accommodate the growing traffic without compromising the performance of the content delivery module 420, and thereby the overall system 400.

In operation of the present system 400, when the user initiates a customization request, the SDK module 430 communicates with the API module 440, sending a first request for the 3D model of the avatar and required first assets. Herein, the term "first assets" refers to the initial set of digital items, features, or components associated with a user's avatar within the content database 410. That is, the first assets are the pre-existing assets available to a user when they first create or customize their avatar within a specific 3D rendering platform 10. These first assets are directly linked to the 3D model of the avatar and may include various customization options such as clothing, facial features, hair textures and colors, accessories, and more. Further, the term "first request" refers to the initial communication initiated by the SDK module 430 to the API module 440 when the user wishes to access and utilize these first assets for avatar customization. Upon receiving the first request from the SDK module 430, the API module 440 forwards the first request to the content delivery module 420. The content delivery module 420 is responsible for fetching the requested 3D model of the avatar and the first assets from the content database 410. The content delivery module 420 efficiently retrieves the requested content, leveraging caching mechanisms and the CDN, if required, to ensure optimal performance and quick response times. Once the content delivery module 420 has fetched the 3D model of the avatar and the relevant first assets from the content database 410, the content delivery module 420 delivers this data back to the SDK module 430. The SDK module 430 then integrates the fetched content with the in-engine avatar customization module 14, enabling the user to seamlessly customize their avatar in real-time within the 3D rendering platform 10. This streamlined process ensures that users can effortlessly personalize their avatars across multiple 3D rendering platforms 10, fostering a more engaging and immersive experience for users as they interact within various virtual environments.

In some scenarios, the user may acquire new customization assets, referred to as "second assets," while using the 3D rendering platforms 10. These second assets may include additional clothing, accessories, or other personalization elements that the user obtains through in-platform achievements, purchases, or other means. To ensure that these newly acquired assets are accessible for future avatar customization, the system 400 allows to save these second assets in the content database 410. For this purpose, the SDK module 430 is further configured to fetch one or more second assets utilized by the user for customization of the avatar as available in and by implementation of the said corresponding in-engine avatar customization module 14 at the runtime. That is, the SDK module 430, integrated with the in-engine avatar customization module 14 of the 3D rendering platform 10, detects the user's utilization of the newly acquired second assets at runtime. The SDK module 430 then retrieves these second assets from the in-engine avatar customization module 14. Also, the API module 440 is further configured to receive a second request from the SDK module 430 for the said one or more second assets for storage in the content database 410. That is, once the second assets are fetched, the SDK module 430 sends a second request to the API module 440. This second request may contain the acquired second assets and may indicate that they should be stored in the content database 410. Further, the content delivery module 420 is further configured to fetch the said one or more second assets from the SDK module 430 in response to the said second request at the API module 440. That is, in response to the second request received at the API module 440, the content delivery module 420 retrieves the second assets from the SDK module 430. This ensures that the content delivery module 420 has access to the new assets for subsequent storage and distribution. Furthermore, the content database 410 is configured to store the said one or more second assets therein. That is, after retrieving the second assets from the SDK module 430, the content delivery module 420 stores them in the content database 410. This allows users to access and utilize the new assets for future avatar customization across the multiple 3D rendering platforms 10. By implementing this process, the system 400 ensures that users' newly acquired assets (i.e., second assets) are saved to be readily available for use in future avatar customization sessions.

According to one or more embodiments, as illustrated in FIG. 4, the system 400 may further include a user account module 450 for recording ownership of the avatar and associated assets for the user. Herein, the user account module 450 records the ownership of the user's 3D avatar model, the initial first assets, and any additional second assets. This ensures that the system 400 accurately tracks digital belongings of the user and enables a smooth and secure user experience across the multiple 3D rendering platforms 10. For this purpose, when a user may first register in the system 400, the user account module 450 creates a unique account for such user, which stores the user's avatar, first assets, and any subsequently acquired second assets. The user account module 450, in conjunction with other components of the system 400 such as the content database 410, ensures that user has access to their avatars and associated assets across the multiple 3D rendering platforms 10. This feature enables a consistent and personalized user experience, regardless of the 3D rendering platform 10 being used.

In an embodiment, the user account module 450 is configured to implement a distributed ledger 452 for recording the ownership of the 3D model of the avatar, the one or more first assets and the one or more second assets for the user. That is, the user account module 450 may implement the distributed ledger 452, such as a blockchain, to provide a secure and transparent method of tracking asset ownership. It may be contemplated by a person skilled in the art that these records may be stored in the distributed ledger 452 to provide a clear and immutable history of each user's digital belongings. This technology ensures that the ownership records are tamper-resistant and easily verifiable, enhancing trust in the system 400. The distributed ledger 452 implemented by the user account module 450 further enables secure and transparent asset transfers between users, such as trading or gifting avatar customization items. Thereby, the user account module 450 is able to track these transactions and updates the ownership records accordingly.

Also, as illustrated in FIG. 4, the system 400 may further include a multi-application caching module 460 for deleting duplicate entries of the 3D model of the avatar and associated assets between the multiple 3D rendering platforms 10 in the user device 300. That is, the system 400 may also incorporate the multi-application caching module 460 designed to optimize the storage and management of the 3D avatar model and its associated assets in the user device 300 when accessed across multiple 3D rendering platforms 10. For this purpose, the multi-application caching module 460 may continuously monitor the cache storage on the user device 300, identifying instances where the 3D avatar model and associated assets are being duplicated across different 3D rendering platforms 10. Upon detecting duplicate entries, the multi-application caching module 460 consolidates them into a single, unified cache entry. This process ensures that only one instance of the 3D avatar model and its related assets are stored on the user device 300, regardless of the number of the 3D rendering platforms 10 being used. Further, the multi-application caching module 460 synchronizes the unified cache entry with each 3D rendering platform 10 to maintain consistency across the 3D rendering platforms 10, and thus ensures that any changes or updates made to the avatar or assets in one of the 3D rendering platforms 10 are reflected across all other platforms, providing a seamless user experience. Finally, the multi-application caching module 460 also efficiently manages the cache storage by regularly checking for outdated or unused avatar models and assets, and removing them as necessary. By eliminating duplicate entries, the multi-application caching module 460 conserves storage space and enhances the overall performance of the user device 300.

Figure 5:
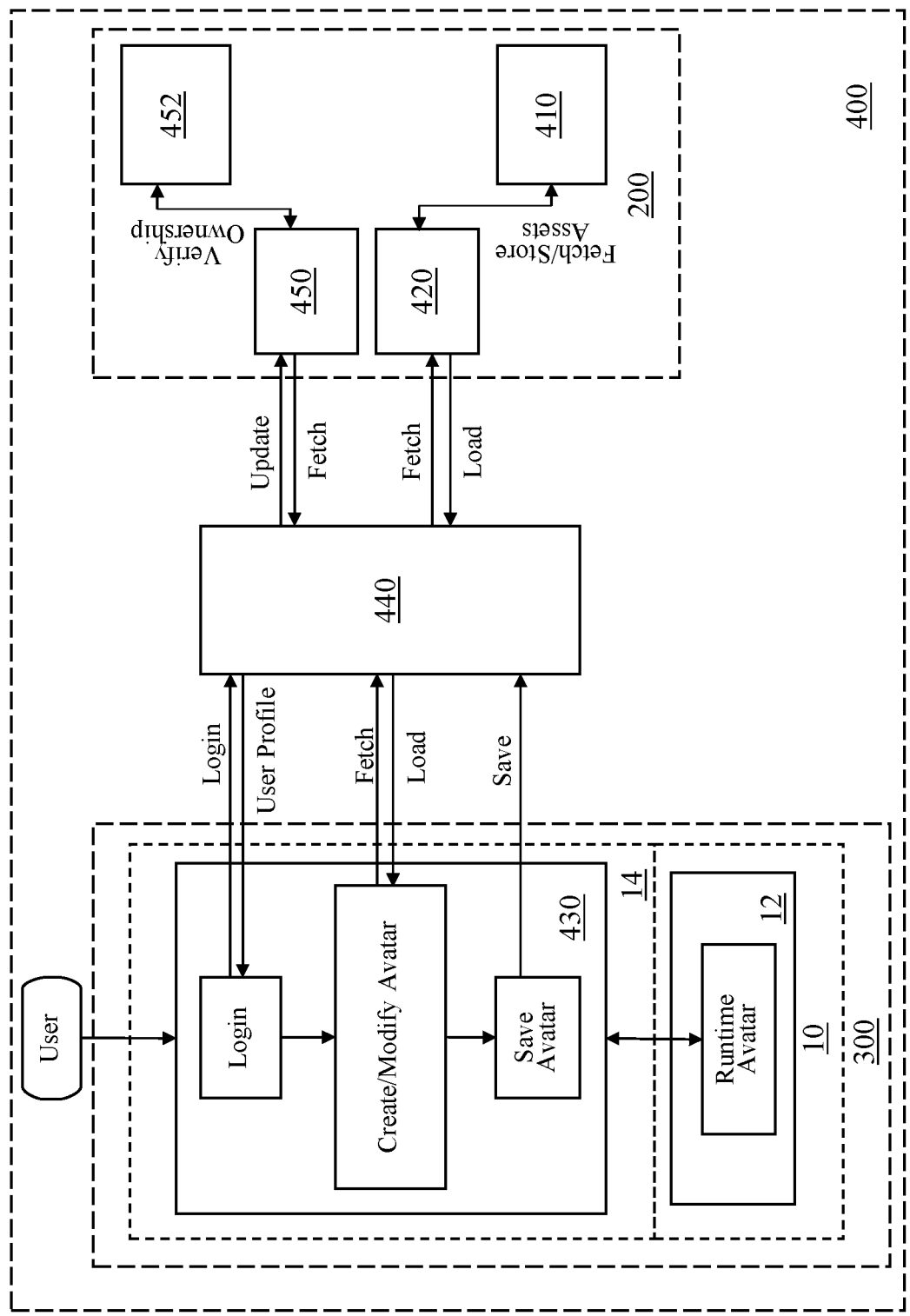
FIG. 5 illustrates a diagram depicting process flow involved in the system for managing the avatar, in accordance with one or more exemplary embodiments of the present disclosure.

Referring to FIG. 5, illustrated is a schematic diagram depicting process flow for implementation of the present system 400 for managing the avatar for the user for use in the multiple 3D rendering platforms 10. The user initiates the process by logging in to the SDK module 430, which is integrated into the in-engine avatar customization module 14 of each 3D rendering platform 10. The login request is sent to the user account module 450 via the API module 440. The user account module 450 verifies the user's credentials and grants them access to their avatar and associated assets, via the API module 440. The user account module 450 incorporates the distributed ledger 452 to record and manage the ownership of the avatar and associated assets. Upon successful login, the user is presented with options to create a new avatar or modify an existing one using the in-engine avatar customization module 14. The user may customize their avatar by choosing from the available assets, such as clothing items, facial features, hair textures, and accessories. Once the user is satisfied with their avatar's appearance, they can save the changes by selecting a save option within the SDK module 430. The SDK module 430 then sends a request to the API module 440, which in turn communicates with the content delivery module 420 to fetch the updated 3D model of the avatar and the selected assets. The content delivery module retrieves the updated 3D avatar model and assets from the content database 410 and delivers them to the SDK module 430. The content database 410 then stores the 3D avatar model and its associated assets for future use. As the user interacts with different 3D rendering platforms 10, they can continue to customize their avatar using the in-engine avatar customization module 14 and the available assets. Any changes made during these sessions are saved and synchronized across platforms through the SDK module 430.

In an embodiment, as illustrated in FIG. 5, the content database 410 and the content delivery module 420 are executed in a server (such as, the server 200). This setup allows for centralized storage and management of the 3D models of avatars, along with their associated first and second assets. The server 200 provides the necessary computational resources and network connectivity to manage the content database 410 effectively and to deliver assets to the SDK module 430 via the content delivery module 420. By executing the content database 410 and the content delivery module 420 on the server 200, the system 400 may efficiently handle multiple requests from different user devices 300 simultaneously, maintaining its performance and responsiveness. The server-based architecture also facilitates easy updates and maintenance for the system 400, as any changes or improvements to the content database 410 or the content delivery module 420 may be implemented on the server-side without requiring updates on the individual user devices 300.

In a specific embodiment, the server 200 is a cloud-based server. Such cloud-based server offers scalability, flexibility, and reliability to efficiently manage the storage and delivery of avatars and associated assets. By utilizing the cloud-based server 200, the content database 410 may store a vast amount of data, including 3D models of avatars, first assets, and second assets, and easily scale its storage capacity as the user base grows. This allows the system 400 to accommodate increasing amounts of data without compromising performance or availability. Further by operating in the cloud-based server 200, the content delivery module 420 may efficiently serve requests from multiple users simultaneously while maintaining low latency and high throughput. In some examples, the content delivery module 420 may be configured to implement an edge server based on a location and/or a bandwidth of the user device 300 for faster delivery to and fetching from the SDK module 430. This cloud-based architecture ensures that the system 400 may effectively manage and deliver avatar data to users across multiple 3D rendering platforms while maintaining optimal performance, security, and scalability.

In an alternate embodiment, the content database 410 and the content delivery module 420 are executed in the user device 300 (not illustrated). With this configuration, the user device takes on the responsibility of locally managing the content database 410 and delivering assets via the content delivery module 420. It may be understood that when the content database 410 and the content delivery module 420 are executed in the user device 300, the system 400 allows for a more decentralized approach to storing and managing the 3D models of avatars, along with their associated assets. By executing the content database 410 and the content delivery module 420 on the user device 300, the system 400 may be able to reduce latency and dependence on server resources, as the data is fetched locally instead of requiring communication with a remote server. Thereby, this approach can improve the responsiveness and performance of the system 400 on the user's end.

Figure 6A:
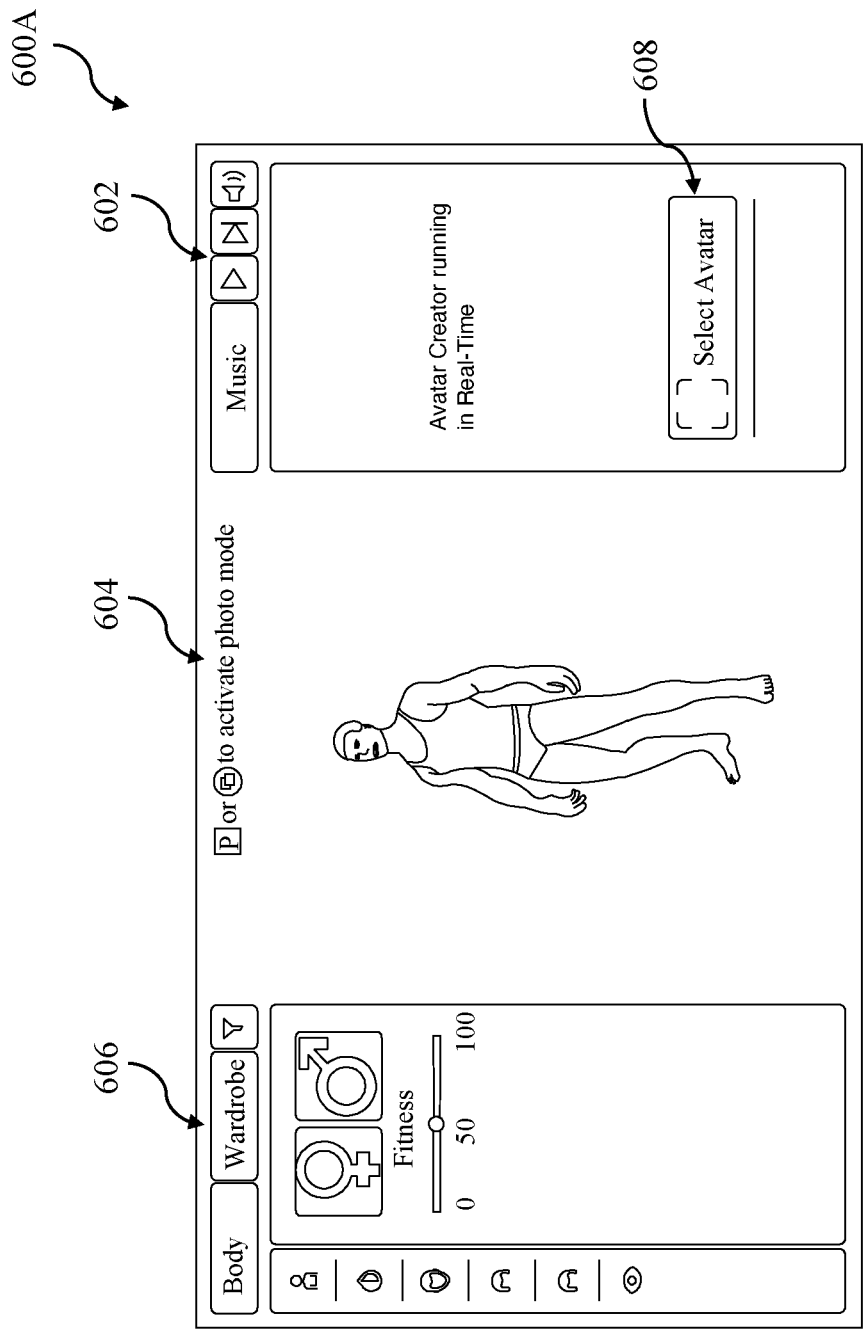
FIG. 6A illustrates an exemplary depiction of a first interface implemented for creating avatar in runtime, in accordance with one or more exemplary embodiments of the present disclosure.
Figure 6B:
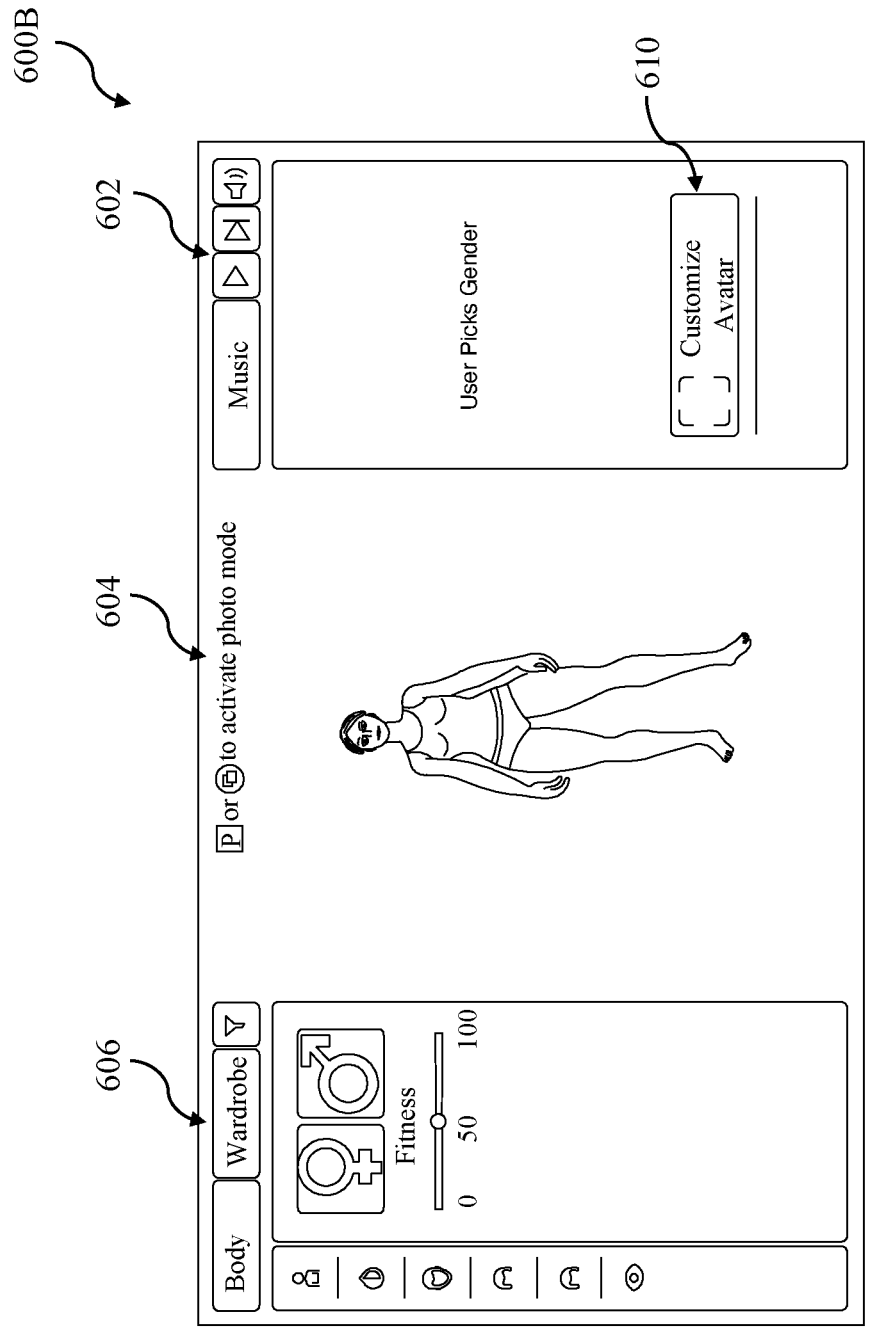
FIG. 6B illustrates an exemplary depiction of a second interface implemented for modelling avatar in runtime, in accordance with one or more exemplary embodiments of the present disclosure.
Figure 6C:
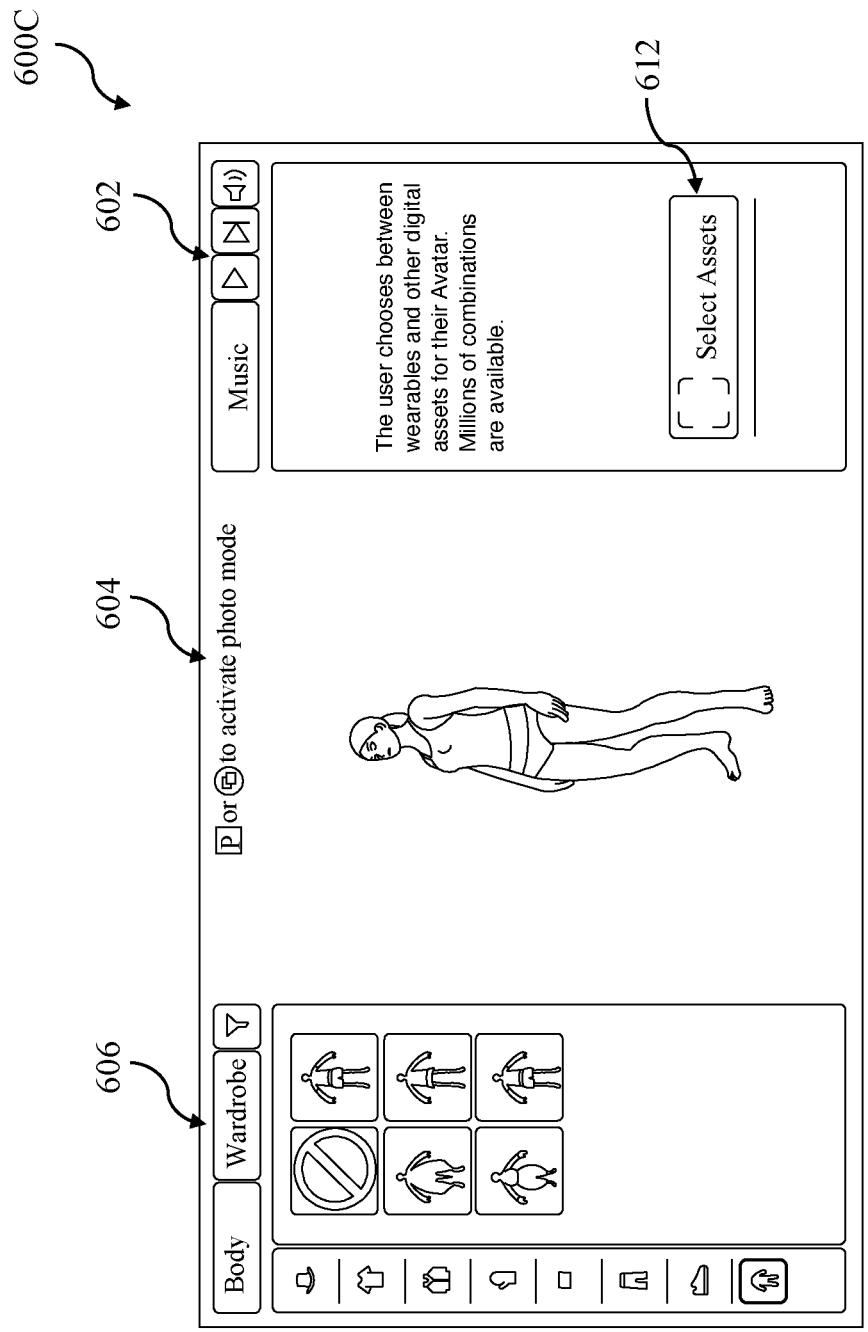
FIG. 6C illustrates an exemplary depiction of a third interface implemented for customizing avatar in runtime, in accordance with one or more exemplary embodiments of the present disclosure.
Figure 6D:
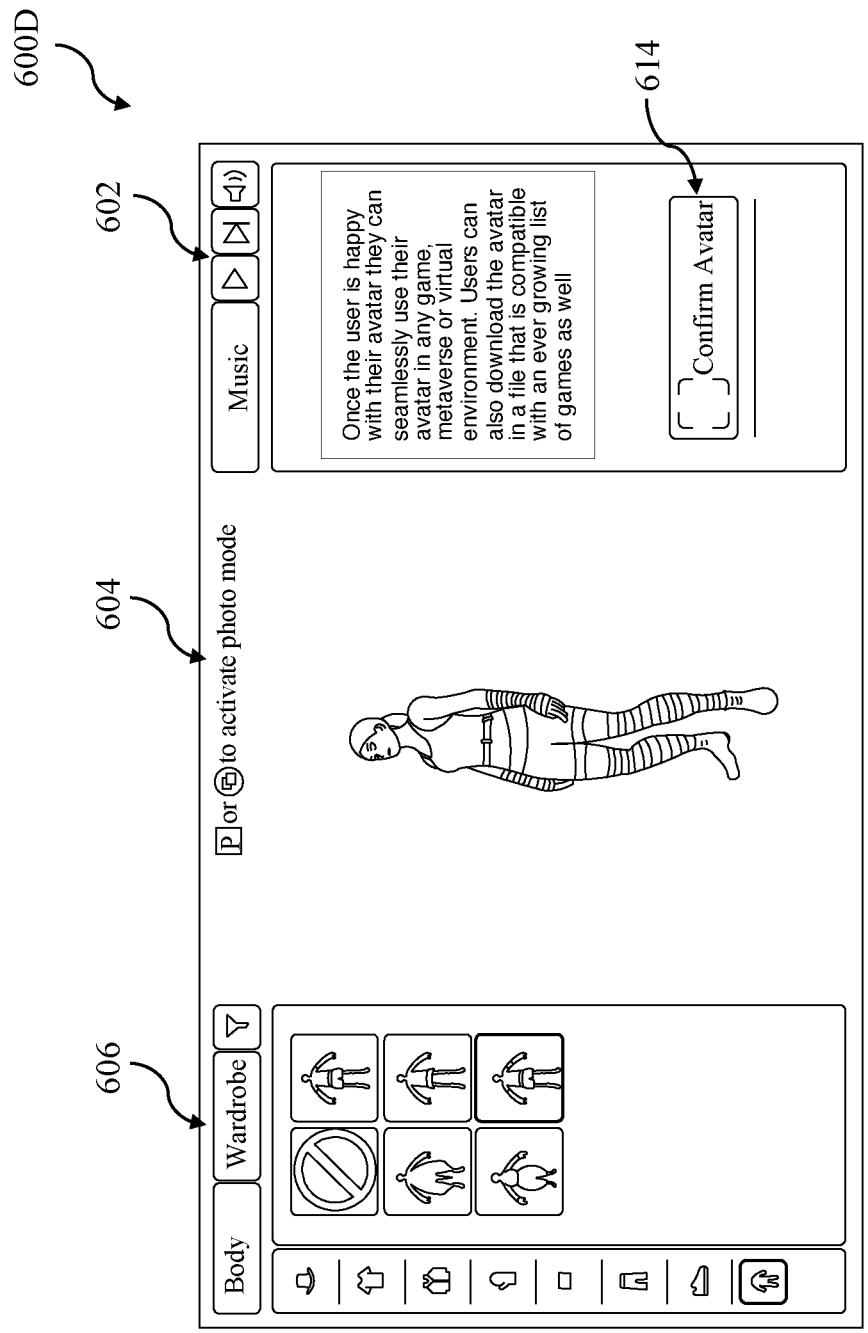
FIG. 6D illustrates an exemplary depiction of a fourth interface implemented for finalizing avatar in runtime, in accordance with one or more exemplary embodiments of the present disclosure.

Referring to FIGS. 6A-6D, illustrated are exemplary depictions of various interfaces which may be implemented to allow the user to manage the avatar as per embodiments of the present disclosure. In particular, FIG. 6A depicts a first interface 600A which provides a dynamic and interactive environment for users to design and customize their avatars in real-time. As users make changes to their avatars, the first interface 600A immediately reflects the alterations, allowing them to visualize their creations without delay. This instant feedback enhances the user experience and promotes a more intuitive and enjoyable avatar design process. In particular, the first interface 600A provides a music panel 602 which allows the users to add music assets to their avatar. The first interface 600A also provides a photo panel 604 which allows the users to add a photo or click a photo (from an associated camera device, like webcam) to customize the avatar accordingly. The first interface 600A further provides a profile panel 606 which allows the users to change profile of the avatar, like selecting gender, changing body type, changing fitness level, adding wardrobe elements, etc. The first interface 600A further provides a Select Avatar button 608 for the user to select the displayed avatar. It may be appreciated that the illustrated first interface 600A is exemplary only and shall not be construed as limiting to the present disclosure in any manner. FIG. 6B depicts a second interface 600B which enables users to choose the gender of their avatar at the initial stage of the creation process. This choice sets the foundation for the avatar's appearance and informs the subsequent customization options available. By offering a user-friendly interface for gender selection, the system 400 ensures that users may easily create avatars that align with their preferences and identity. The second interface 600B provides a Customize Avatar button 610 for the user to customize the displayed avatar. As soon as the gender selection or any other action related to change in the body profile of the avatar may be completed by the user, the corresponding avatar image may change in the second interface 600B to reflect such action of the user. FIG. 6C depicts a third interface 600C which allows users to personalize their avatars by selecting from a wide variety of assets including clothing, accessories, hairstyles, and other customizable elements. With numerous possible combinations, users can create a unique avatar that reflects their style and personality. The third interface 600C provides a Select Assets button 612 for the user to select the assets for the avatar. The third interface 600C fosters creativity and self-expression, enhancing the overall avatar creation experience. FIG. 6D depicts a fourth interface 600D which enables the user to seamlessly use their avatar in the multiple 3D rendering platforms 10. The fourth interface 600D provides a Confirm Avatar button 614 for the user to finalize the displayed avatar. That is, upon finalizing their avatar design, the user can take advantage of the SDK module 430 to effortlessly integrate their avatar into various 3D rendering platforms 10, including games, metaverses, and virtual environments. Additionally, the fourth interface 600D may offer the users the option to download their avatar as an FBX (Filmbox), GLB (GL Binary), GLTF (Graphics Library Transmission Forma), or VRM (Virtual Reality Modeling) file, ensuring compatibility with a wide range of gaming platforms and applications. Thus, the fourth interface 600D empowers users to fully enjoy and utilize their custom avatars across multiple digital environments.

Figure 7:
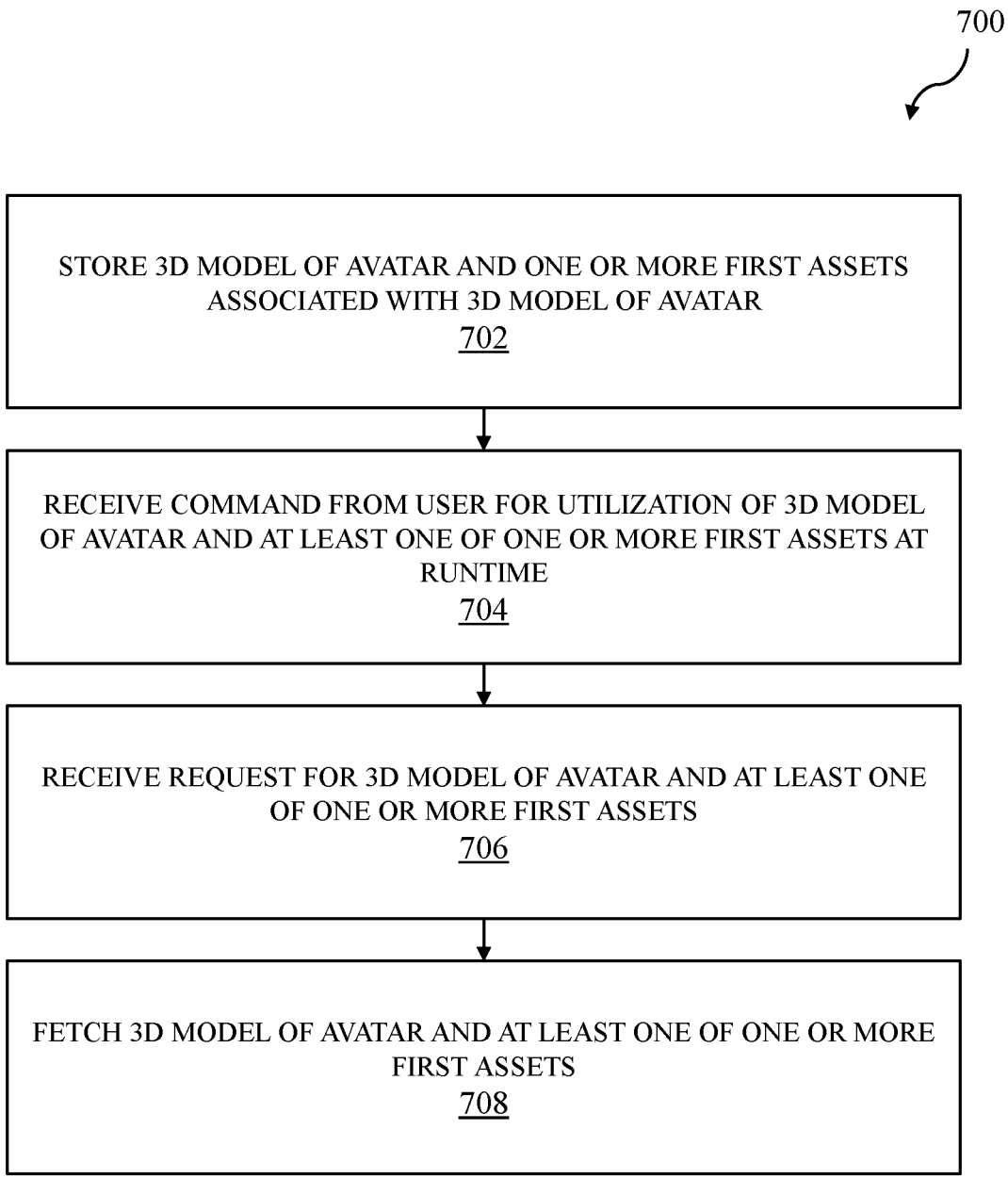
FIG. 7 illustrates a flowchart listing steps involved in a method for managing avatar for a user, in accordance with one or more exemplary embodiments of the present disclosure.

The present disclosure further provides a method for managing an avatar for a user for use in the multiple 3D rendering platforms 10. Referring now to FIG. 7, illustrated is a flowchart for the said method (as represented by reference numeral 700) listing steps involved therein. Various embodiments and variants disclosed above with respect to the system 400 for managing the avatar apply mutatis mutandis to the present method 700. Thus, the details as described above with respect to specific elements have not been repeated herein for brevity of the present disclosure. Also, it may be contemplated that steps (as described hereinafter) for the method 700 are only illustrative and other alternatives can also be provided where one or more steps are added, one or more steps are removed, or one or more steps are provided in a different sequence without departing from the spirit and the scope of the present disclosure.

At step 702, the method 700 includes storing, in the content database, the 3D model of the avatar and the one or more first assets associated with the 3D model of the avatar, as available with the user. This step 702 involves creating a storage system for the user's avatar and its associated assets, ensuring they are readily accessible for future use. At step 704, the method 700 includes receiving a command from the user for utilization, via the SDK module 430 integrated with the in-engine avatar customization module 14 of each one of the multiple 3D rendering platforms 10, of the said 3D model of the avatar and at least one of the said one or more first assets compatible with the corresponding in-engine avatar customization module 14 at the runtime, to customize the avatar. This step 704 involves the user interacting with the SDK module 430 to request the customization of their avatar using the available assets in real-time, which is made possible by integrating the SDK module 430 with the in-engine avatar customization module 14. At step 706, the method 700 includes receiving the first request from the SDK module 430 for the said 3D model of the avatar and the said at least one of the one or more first assets. That is, the first request is received from the SDK module 430 to access the user's avatar and its associated assets. At step 708, the method 700 includes fetching the said 3D model of the avatar and the said at least one of the one or more first assets from the content database 410 in response to the said first request, for delivery to the SDK module 430. Herein, the API module 440 retrieves the requested avatar and assets from the content database 410 and delivers them to the SDK module 430 for use in customizing the avatar.

In one or more embodiments, the method 700 also includes fetching the one or more second assets utilized by the user for customization of the avatar as available in and by implementation of the said corresponding in-engine avatar customization module 14. This step involves accessing additional assets that the user has acquired or created within the 3D rendering platforms. The method 700 further includes receiving the second request from the SDK module 430 for the said one or more second assets for storage in the content database 410. Herein, the API module 440 receives the second request to store the new assets in the content database 410 for future use. The method 700 further includes fetching the said one or more second assets from the SDK module 430 in response to the said second request. Herein, the API module 440 retrieves the new assets from the SDK module 430. The method 700 further includes storing the said one or more second assets in the content database 410. That is, the new assets are stored in the content database 410 alongside the user's avatar and first assets.

In one or more embodiments, the method 700 further includes recording ownership of the 3D model of the avatar, the one or more first assets, and the one or more second assets for the user. This step utilizes the user account module 450 to ensure that users maintain ownership of their avatars and associated assets. For this purpose, the method 700 further includes implementing the distributed ledger 452 for recording the ownership of the 3D model of the avatar, the one or more first assets, and the one or more second assets for the user. The distributed ledger 452, such as a blockchain, is used to record ownership information securely and transparently.

In one or more embodiments, the method 700 further includes deleting duplicate entries of the 3D model of the avatar, the one or more first assets, and the one or more second assets between the multiple 3D rendering platforms 10 in the user device 300. This step optimizes storage by eliminating redundant data across different 3D rendering platforms 10 in the user device 300, for efficient storage.

In an embodiment, the method 700 further includes executing the content database 410 and the content delivery module 420 in the server 200. This ensures that the content database 410 and the content delivery module 420 are hosted on the server 200 for optimal performance and accessibility. In another embodiment, the method 700 further includes executing the content database 410 and the content delivery module 420 in the user device 300. That is, the content database 410 and content delivery module 420 may alternatively be executed within the user device 300, providing a different implementation option that can cater to specific user needs or requirements. This approach may offer advantages such as reduced latency or increased privacy, depending on the specific use case and user preferences.

The present disclosure provides the system 400 and the method 700 for creating and customizing avatars to a granular level that can be used across various games, metaverses, or any other real-time 3D rendered environment. The present disclosure utilizes several technologies, including 3D game engines, in-engine runtime avatar customization systems, remote addressable asset systems, cloud storage, content delivery network, user account databases, multi-application caching systems, and blockchain technology for achieving the said purpose in an efficient manner. The present disclosure allows users to change items while in runtime, enabling users to pick up assets from one game or metaverse and use them in another. Specifically, the present disclosure provides an SDK that allows developers to deploy avatars, wearables, digital items, music, and video into any game, metaverse, or 3D application, and thus provides a seamless experience for the user, allowing them to easily customize and modify their avatars, and enables users to interchange their avatars and assets between games and metaverses as desired. Ownership of assets is stored using blockchain technology, and assets can be added to the catalog at any time.

The present disclosure offers several advantages over existing solutions. Firstly, the system 400 and the method 700 provide a seamless experience for the user, allowing them to easily interchange their avatars and assets between games and metaverses without the need for manual import and export processes. This saves time and effort for the user, enhancing their overall experience. Secondly, the system 400 and the method 700 offer a more efficient way to manage avatar ownership and associated assets using the distributed ledger 452, which ensures a transparent and decentralized method for managing asset ownership. This can help to prevent disputes and provide users with greater control over their avatars and assets. Lastly, the multi-application caching module 460 helps to optimize resource usage by deleting duplicate entries of avatar and asset data between multiple real-time 3D rendering platforms in the user device 300. This can improve the performance of the system 400 and reduce the amount of storage space required on the user device 300. Overall, the present disclosure provides a more seamless and efficient way to manage avatars and their associated assets for use across multiple real-time 3D rendering platforms 10, addressing the limitations of existing solutions and improving the user experience.

The foregoing descriptions of specific embodiments of the present disclosure have been presented for purposes of illustration and description. Those are not intended to be exhaustive or to limit the present disclosure to the precise forms disclosed, and obviously many modifications and variations are possible in light of the above teaching. The exemplary embodiments have been chosen and described in order to best explain the principles of the present disclosure and its practical applications, to thereby enable others skilled in the art to best utilize the present disclosure and various embodiments with various modifications as are suited to the particular use contemplated. Modifications to embodiments of the present disclosure described in the foregoing are possible without departing from the scope of the present disclosure as defined by the accompanying claims.

The invention claimed is:

1. A system for managing an avatar for a user for use in multiple three-dimensional (3D) rendering platforms to be executed in a user device, with each one of the multiple 3D rendering platforms comprising a 3D game engine module configured to render the avatar in runtime and an in-engine avatar customization module to allow the user to interchange assets for customization of the avatar at the runtime, the system comprising:
- a content database configured to store a 3D model of the avatar and one or more first assets associated with the 3D model of the avatar, as available with the user;
- a content delivery module communicatively coupled with the content database;
- a Software Development Kit (SDK) module adaptively integrated with the in-engine avatar customization module of each one of the multiple 3D rendering platforms; and
- an Application Programming Interface (API) module in communication with the content delivery module and the SDK module, wherein:
- the SDK module is configured to allow for utilization of the 3D model of the avatar and at least one of the one or more first assets compatible with the corresponding in-engine avatar customization module at the runtime, for the user to customize the avatar by implementing the corresponding in-engine avatar customization module,
- the API module is configured to receive a first request from the SDK module for the 3D model of the avatar and the at least one of the one or more first assets,
- the content delivery module is configured to fetch the 3D model of the avatar and the at least one of the one or more first assets from the content database in response to the first request at the API module, for delivery to the SDK module,
- the SDK module is further configured to fetch one or more second assets utilized by the user for customization of the avatar as available in and by implementation of the corresponding in-engine avatar customization module at the runtime,
- the API module is further configured to receive a second request from the SDK module for the one or more second assets for storage in the content database,
- the content delivery module is further configured to fetch the one or more second assets from the SDK module in response to the second request at the API module, and
- the content database is configured to store the one or more second assets therein.

2. The system according to claim 1 further comprising a user account module configured to record ownership of the 3D model of the avatar, the one or more first assets and the one or more second assets for the user.

3. The system according to claim 2, wherein the user account module is configured to implement a distributed ledger for recording the ownership of the 3D model of the avatar, the one or more first assets and the one or more second assets for the user.

4. The system according to claim 1 further comprising a multi-application caching module configured to delete duplicate entries of the 3D model of the avatar, the one or more first assets and the one or more second assets between the multiple 3D rendering platforms in the user device.

5. The system according to claim 1, wherein the content database and the content delivery module are executed in a server.

6. The system according to claim 5, wherein the server is a cloud-based server.

7. The system according to claim 1, wherein the content database and the content delivery module are executed in the user device.

8. The system according to claim 1, wherein the one or more first assets and the one or more second assets comprises at least one of: separate layer of clothing including shirt, t-shirt, pants, over-jacket; facial features; hair texture; hair color; eye-glasses; make-up features; mask; hat; jewelry; shoes; gloves; music.

9. The system according to claim 1, wherein the user device comprises at least one of: a personal computer, a smartphone, a gaming console, a portable gaming device, a headset, a heads-up display.

10. The system according to claim 1, wherein the multiple 3D rendering platforms comprises: video games, metaverses, social virtual reality applications.

11. The system according to claim 1, wherein the 3D game engine module comprises at least one of: Unity engine®, Unreal engine®, Godot engine®, CryEngine®.

12. A method for managing an avatar for a user for use in multiple 3D rendering platforms to be executed in a user device, with each one of the multiple 3D rendering platforms comprising a 3D game engine module configured to render the avatar in runtime and an in-engine avatar customization module to allow the user to interchange assets for customization of the avatar at the runtime, the method comprising:
- storing, in a content database, a 3D model of the avatar and one or more first assets associated with the 3D model of the avatar, as available with the user;
- receiving a command from a user for utilization, via a Software Development Kit (SDK) module integrated with the in-engine avatar customization module of each one of the multiple 3D rendering platforms, of the said 3D model of the avatar and at least one of the said one or more first assets compatible with the corresponding in-engine avatar customization module at the runtime, to customize the avatar;
- receiving a first request from the SDK module for the said 3D model of the avatar and the said at least one of the one or more first assets;
- fetching the said 3D model of the avatar and the said at least one of the one or more first assets from the content database in response to the said first request, for delivery to the SDK module;
- fetching one or more second assets utilized by the user for customization of the avatar as available in and by implementation of the said corresponding in-engine avatar customization module;
- receiving a second request from the SDK module for the said one or more second assets for storage in the content database;
- fetching the said one or more second assets from the SDK module in response to the said second request; and
- storing the said one or more second assets in the content database.

13. The method according to claim 12 further comprising recording ownership of the 3D model of the avatar, the one or more first assets and the one or more second assets for the user.

14. The method according to claim 13 further comprising implementing a distributed ledger for recording the ownership of the 3D model of the avatar, the one or more first assets and the one or more second assets for the user.

15. The method according to claim 12 further comprising deleting duplicate entries of the 3D model of the avatar, the one or more first assets and the one or more second assets between the multiple 3D rendering platforms in the user device.

16. The method according to claim 12 further comprising executing the content database and the content delivery module in a server.

17. The method according to claim 12 further comprising executing the content database and the content delivery module in the user device.

18. A computer program comprising instructions which, when the computer program is executed by a processing unit, cause the processing unit to carry out the method of claim 12.

* * * * *